Patented May 15, 1945

2,376,067

UNITED STATES PATENT OFFICE 2,376,067

UNSATURATED CARBOXYLIC ACIDS

John R. Long, Stow, Ohio, assignor to Wingfoot Corporation, Akron, Ohio, a corporation of Delaware No Drawing. Application April 15, 1943,
Serial No. 483,178

3 Claims. (Cl. 260—539)

This invention relates to a method for the preparation of certain unsaturated carboxylic acids from halogenated saturated carboxylic acids. More particularly, the invention concerns a method of readily removing a molecule of hydrogen halide from a beta halocarboxylic acid having at least one hydrogen on the alpha carbon atom to yield the corresponding unsaturated compound.

It has been observed as a result of experimentation that tertiary amines and tertiary amine salts may be employed in catalytic amounts to remove readily a molecule of hydrogen halide, e. g., hydrogen chloride or hydrogen bromide from a beta halocarboxylic acid having at least one hydrogen atom on the alpha carbon atom. Suitable starting materials are included by the general formula:

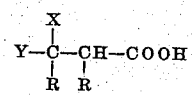

where X is halogen, specifically chlorine or bromine, and R is hydrogen, halogen, alkyl or other organic radical, each R denoting the same or a different radical within the same compound, and Y is halogen or an alkyl or other organic radical. Specifically, it may be said that suitable raw materials are the saturated carboxylic acids which carry at least one hydrogen on the alpha carbon atom and at least one halogen on the beta carbon atom. The beta halogen substituent is in addition to another non-hydrogen substituent which is also present.

The product is in every case an alpha, beta unsaturated carboxylic acid in which the beta carbon atom is further substituted, as by an organic radical, such as alkyl or by a halogen radical such as chlorine or bromine. It has been found that those carboxylic acids in which the double bond is not thus removed from the end of the molecule are polymerized by the heat necessary for the reaction of formation and cannot be recovered in monomeric form. The invention is particularly directed to the preparation of aliphatic carboxylic acids of the above description, whether or not containing an aromatic constituent. Additional halogen may be present in the compound, only one halogen atom being removed by the dehydrohalogenating step.

The method is carried out by heating the beta halocarboxylic acid in the presence of the tertiary amine or tertiary amine salt until an amount of hydrogen halide is split off and removed corresponding to one mol of the hydrogen halide, i. e., the theory calls for the removal of one mol of hydrogen halide for each mol of the halocarboxylic acid treated. The halide of the amine used is formed in the reaction after a small amount of hydrogen halide is split out, and it is probable that this salt is the actual catalyst. In any event, the amine and its salts may be viewed as equivalents for the purposes of the invention.

The process is illustrated by the following example, but it will be understood that no limitation is intended thereby.

Example

A mixture of 100 grams of alpha, beta dichlorbutyric acid and one gram of triamylamine was heated at a temperature of 160–180° C. under an air reflux condenser until it was observed that the theoretical loss in weight corresponded to the splitting out of one mol of hydrogen chloride per mol of raw material. From twelve to sixteen hours heating is required to accomplish this. The reaction mixture was then distilled at reduced pressure, say 10 to 60 mm./Hg, to separate the product from the amine salt. Alpha chlorcrotonic acid, a white solid, was obtained as the product in a yield of 85%. The reaction involved is indicated by the following equation:

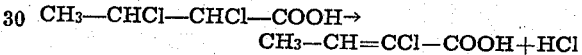

The amount of tertiary amine required is quite small compared with the quantity of material treated, the amine being used, in fact, in catalytic amount, as distinguished from the use of an amine in an amount which is molecularly equivalent to the hydrogen halide to be removed. It will thus be apparent that the amine acts as a catalyst and not by permanent combination with the hydrogen halide. In fact, the amount of amine employed will be less than 5%, and preferably from 1% to 2%, on the weight of the raw material to be treated. Various tertiary amines may be employed, the trialkyl amines being preferred, but any of the following, for example, may be used: triethylamine, tripropylamine, tributylamine, triamylamine, dimethyl ethylamine, diethyl propylamine, diamylmethylamine, dibutyl amylamine, diethyl hexylamine, and dimethylaniline.

The reaction may be carried out at any suitable temperature and will be continued, for maximum yield, until approximately one mol of hydrogen halide has been removed for each mol of the dihalocarboxylic acid being treated. This point can be determined by weighing the contents of the reactor, or by other feasible means. While, as stated, various suitable temperatures may be employed, it is found that usually a temperature between about 130° and 200° C. is satisfactory.

The method may be applied to the treatment of saturated beta halocarboxylic acids having a hydrogen on the alpha carbon atom and also being further substituted on the beta carbon atom. For example, suitable raw materials are those beta halocarboxylic acids which also possess a gamma carbon atom or have a chain of at least four carbon atoms, including that of the carboxyl group. Additionally, the beta, beta-dihalocarboxylic acids which are of saturated nature and carry at least one hydrogen on the alpha carbon atom may be used. The class includes, for example, beta, beta-dichlorpropionic acid; alpha, beta, beta-trichlorpropionic acid; alpha, beta-dichlorbutyric acid; alpha, beta, beta-trichlorbutyric acid; beta chlorhydrocinnamic acid; alpha, beta-dichlorvaleric acid; as well as the corresponding bromo compounds.

From the foregoing raw materials may be obtained, by the practice of the invention, beta chloracrylic acid; alpha, beta dichloracrylic acid; alpha chlorcrotonic acid; alpha, beta-dichlorcrotonic acid; cinnamic acid; and alpha-chlor, beta-ethyl acrylic acid.

While there have been described above certain preferred embodiments of the invention, it will be apparent to those skilled in the art that various modifications and changes may be made therein without departing from the spirit of the invention or from the scope of the appended claims.

I claim:

1. In the process of preparing an alpha, beta unsaturated carboxylic acid the beta carbon atom of which carries at least one substituent other than hydrogen, the step of producing the acid in monomeric form directly from the corresponding saturated carboxylic acid having at least one hydrogen on the alpha carbon atom and at least one halogen on the beta carbon atom, which comprises heating the saturated acid in the presence of less than about 5% of a tertiary amine salt at a temperature between about 130° C. and about 200° C. until approximately one mole of hydrogen halide has been removed for each mole of saturated acid, and then separating the monomeric unsaturated acid from the reaction mass.

2. In the process of preparing an alpha, beta unsaturated carboxylic acid containing a gamma carbon atom, the step of producing the acid in monomeric form directly from the corresponding saturated carboxylic acid having at least one hydrogen on the alpha carbon atom and at least one halogen on the beta carbon atom, which comprises heating the saturated acid in the presence of less than about 5% of a tertiary amine salt at a temperature between about 130° C. and about 200° C. until approximately one mole of hydrogen halide has been removed for each mole of saturated acid, and then separating the monomeric unsaturated acid from the reaction mass.

3. In the process of preparing alpha chlorocrotonic acid, the step of producing the acid in monomeric form directly from dichlorobutyric acid, which comprises heating the dichlorobutyric acid in the presence of less than about 5% of a tertiary amine salt at a temperature between about 130° C. and about 200° C. until approximately one mole of hydrogen chloride has been removed from one mole of the dichlorobutyric acid and then separating the monomeric alpha chlorocrotonic acid from the reaction mass.

JOHN R. LONG.